A. L. MARCUM.
AUTOMOBILE BODY BRACE.
APPLICATION FILED OCT. 3, 1917.

1,266,528.

Patented May 14, 1918.

Inventor
Albert Lee Marcum,
By
Attorney

UNITED STATES PATENT OFFICE.

ALBERT LEE MARCUM, OF LOUISVILLE, KENTUCKY, ASSIGNOR TO DOW WIRE & IRON WORKS, OF LOUISVILLE, KENTUCKY, A CORPORATION OF KENTUCKY.

AUTOMOBILE-BODY BRACE.

1,266,528.   Specification of Letters Patent.   Patented May 14, 1918.

Application filed October 3, 1917. Serial No. 194,616.

*To all whom it may concern:*

Be it known that I, ALBERT LEE MARCUM, a citizen of the United States, residing at Louisville, in the county of Jefferson and State of Kentucky, have invented certain new and useful Improvements in Automobile-Body Braces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to automobiles, but more particularly to a body brace therefor, and the invention has for its object to provide a transverse body brace for the purpose of supporting and stiffening the running boards of an automobile, and for the further purpose of simultaneously supporting and stiffening the longitudinal chassis frame members upon which the body of the machine is mounted.

In the use of devices of this character I have found that while a transverse brace for supporting the running boards is of great efficiency, there remains a tendency for the chassis frame members to spring laterally and this springing of the chassis frame members prevents an absolutely rigid construction unless properly provided against. I have also found that a transverse brace under and supporting the running boards of a machine has a decided tendency to spring or bow, and this springing or bowing upwardly causes the rods connecting with the chassis frame members to become loose and to move longitudinally of the chassis frame members so as to cause a shifting of the position of the running board brace.

In order to obviate these disadvantages and to provide an absolutely rigid and permanent body brace I have provided in connection with a transverse running board support a transverse chassis frame support in the manner as will be hereinafter described, and as shown in the accompanying drawing.

The invention consists in the novel construction and arrangement of the two transverse supports in connection with the connecting or tying brace rods, all of which will be first fully described and afterward specifically pointed out in the appended claims.

Referring to the accompanying drawing—

Figure 1:
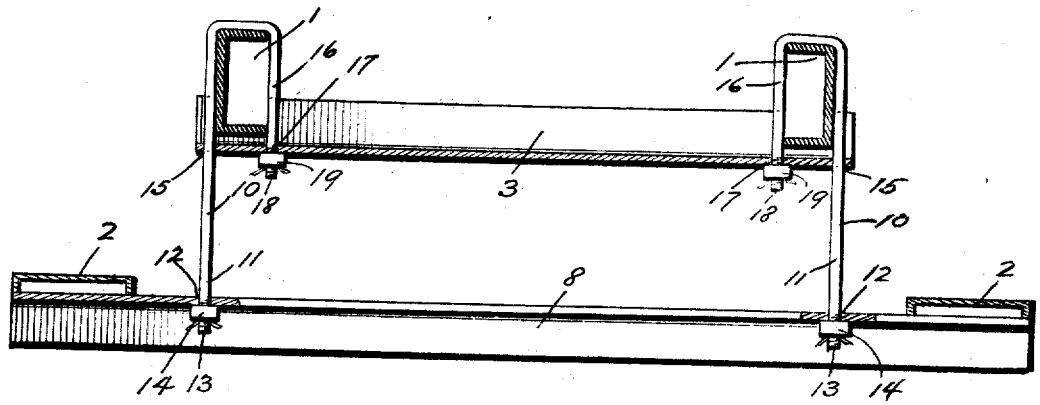
Figure 2:
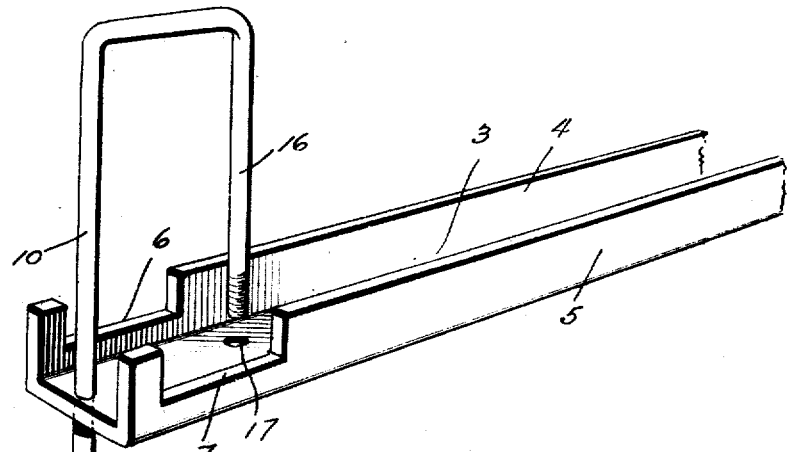

Figure 1 is a transverse sectional view through the chassis frame members of an automobile illustrating also in section the running boards of an automobile, and illustrating in section the body brace in operative position, and Fig. 2 is a fragmentary perspective view illustrating the transverse brace member and one of the connecting members or tie rods.

Like numerals of reference indicate the same parts throughout the two figures, in which—

1 indicates the longitudinal chassis frame members of an automobile which are usually of channel iron, as shown in Fig. 1, while 2 indicates the transverse running boards of a machine. 3 indicates a transverse brace member having its vertical walls 4 and 5 provided with coinciding rectangular openings 6 and 7 arranged near the ends of the brace member 3 and of a size to receive the lower portions of the chassis frame members 1 in the manner as is shown in Fig. 1. Directly under the transverse chassis frame members 1 I provide a transverse angle or channel brace member 8. 10 indicates the vertical connecting or tying rods which as shown in Fig. 1 are substantially U-shaped, the longer vertical arm 11 passing through a hole or perforation 12 in the angle or channel brace 8, said longer arm 11 being threaded at 13 to receive a nut 14. The longer arm 11 of the U-shaped rod 10 passes also through a perforation or opening 15 in the brace member 3, the U portion of the rod 10 passing over the chassis frame 1, its shorter arm 16 passing downwardly through a perforation or opening 17 in the brace member 3, said arm 16 being threaded at 18 to receive a nut 19.

Having thus fully described the several parts of this invention, its operation is as follows:

The parts being assembled as shown in Fig. 1 the nut 19 on the shorter arm 16 is threaded snugly against the bottom surface of the brace member 3. This causes the brace member 3 to be tightly and snugly drawn into position under the chassis members 1, and as the said chassis members 1 enter the openings or recesses 6 7 in the brace member 3, said chassis members 1 are effectually tied together in a permanent manner, while any and all transverse bowing or movement of the chassis members 1 is entirely eliminated. The brace members 3 are tightly drawn into engagement with the chassis member 1 to such extent that any longitudinal movement of the connecting or tying rods 10 is effectually eliminated. The nuts 14 being then threaded up on the longer arms 11 of the connecting or tying rods 10 raise the transverse running board members 8 up and snugly under the running boards 2 so as to effectually and rigidly support the running boards and tie the same to the chassis frame pieces 1. By reason of this construction all tendency of the chassis frame members 1 to bow or move transversely is entirely eliminated, while any slight loosening or bowing of the running board brace members 8 will not cause a longitudinal movement of the tie rods 10, and a consequent shifting of the brace. It will therefore be seen that by this construction an absolutely rigid bracing arrangement is provided which is extremely simple in construction, cheap and easy to manufacture and is strong durable and efficient.

Having thus fully described the invention, what I claim as new and desire to secure by Letters Patent of the United States, is;

A brace of the character described for automobiles including a transverse bracing member disposed under the running boards of an automobile, a transverse bracing member provided with depressions to receive the longitudinal chassis frame members of an automobile, to tie said chassis frame members together against relative lateral movement, the last mentioned transverse member being arranged under and in close lateral engagement with the longitudinal chassis frame members of an automobile, a connecting or tying rod of U-shaped formation having its shorter end passed through the said longitudinal chassis frame bracing member and its longer end passed through the said transverse running board bracing member and including means for drawing the said two transverse bracing members snugly and tightly into position, the whole arranged in such manner that the said transverse bracing member for the chassis frame prevents casual shifting of the running board transverse bracing member, substantially as described and for the purposes set forth.

In testimony whereof, I affix my signature, in presence of a witness.

ALBERT LEE MARCUM.

Witness:
MINETTE A. BERGMANN.